A. RAISON AND T. A. BURGESS.
PISTON CHUCK.
APPLICATION FILED MAR. 8, 1918.
1,361,773.
Patented Dec. 7, 1920.
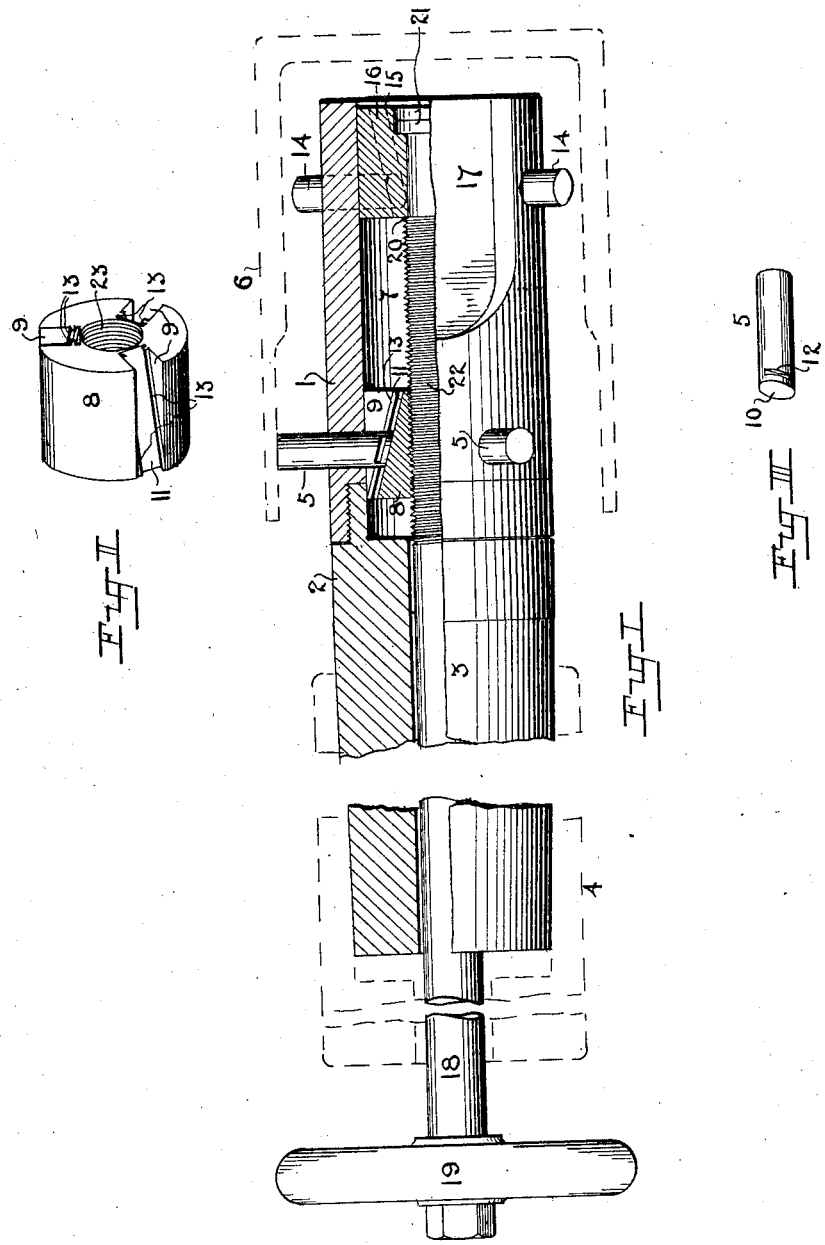
Inventors:
Alfred Raison & Thomas Alfred Burgess
per H. W. Plucker
Attorney.

UNITED STATES PATENT OFFICE.

ALFRED RAISON AND THOMAS ALFRED BURGESS, OF JOHANNESBURG, TRANSVAAL, SOUTH AFRICA.

PISTON-CHUCK.

1,361,773.  Specification of Letters Patent.  Patented Dec. 7, 1920.

Application filed March 8, 1918. Serial No. 221,302.

*To all whom it may concern:*

Be it known that we, ALFRED RAISON and THOMAS ALFRED BURGESS, subjects of the King of Great Britain, and residents of 10 Harries street, Johannesburg, Transvaal Province of the Union of South Africa, have invented certain new and useful Improvements in Piston-Chucks, of which the following is a specification.

The present invention relates to internal chucks suitable for holding pistons for turning and of the kind in which the chuck head is provided with two sets of radial pins which are projected to grip the interior of the hollow body, the projection being effected by differentially moved devices which insure each set of pins being projected with substantially equal pressure.

An object of the invention is to provide such a chuck of simple construction and in which the pins are positively moved both outwardly and inwardly so facilitating the insertion of the chuck into a piston.

The invention is illustrated in the accompanying drawings in which,

Figure I is an elevation, half in section.

Fig. II is a perspective view of a wedge block.

Fig. III is a perspective view of a pin.

The chuck body consists of a head 1 which is screwed onto a chuck stem 2. The latter is shown as tapered externally at 3 to fit a lathe mandrel 4.

At the rear end of the head is a set of pins 5 passing radially through holes in the chuck head and free to slide in and out thereof. Fig. III shows one of the pins detached. These pins are forcibly thrust out to engage the interior of the piston or other article 6 to be chucked.

Within the bore 7 of the chuck is a cylindrical wedge block 8 adapted to move axially in said bore. Said wedge block is shown separately in Fig. II and is formed with slots 9. The pins 5 enter said slots and the ends 10 of the pins bear on the bottoms 11 of said slots; and said bottoms and ends are so inclined as shown that by traversing the wedge block 8 past the pins toward the right of Fig. I, the pins 5 are thrust outward, each to the same extent.

To prevent the pins 5 from falling out of place and to enable them to be retracted, shallow grooves 12 are engaged by ribs 13 on the sides of the slot. This set of pins consists of three equidistantly spaced around the circumference, giving an equal bearing around the article chucked. At the forward end of the chuck is another set of pins 14 similarly arranged and actuated by a wedge block 15; the inclination of the wedge surfaces 16 in the latter however being opposite to those in the block 8 so that the pins 14 are projected by a left hand movement of the block 15.

It is preferred to have four pins in the forward set, arranged in pairs of which the units are spaced about 60° from each other, thus leaving sufficient clearance between the pairs for the gudgeon bosses of the piston 6 to pass. For the same reason the sides 17 of the chuck head are cut away.

18 is a spindle passing axially through the chuck and free both to rotate and move endwise therein. The spindle is long enough to pass through the lathe mandrel 4 and when so passed through is fitted with a hand wheel 19 for rotating it. At its forward end the spindle is engaged with the block 15 by its shoulder 20 and the lock nuts 21 which hold said block and the spindle together against endwise movement, but allow the spindle to rotate. The intermediate part 22 of the spindle is screw threaded and works through the tapped hole 23 in the block 8.

Upon the spindle 18 being appropriately turned, the blocks 8 and 15 relatively approach one another, they being prevented from turning by their pins 5 and 14. The actual traversing movement may be imparted to either or to both. The effect of such traversal is to project the pins 5 or 14 associated with the moving block. Assume for example that the block 8 begins to move by itself. The effect is to project the pins 5 until they engage the interior of the piston 6. They then hold the block 8 stationary and the traversing movement is continued by the block 15, the spindle 18 moving axially with the latter. This projects the pins 14 until they also engage the interior of the piston 6 so tending to stop their block 15. A slight further rotation of the spindle 18 then presses out both sets of pins 5 and 14 with equal force, any extra yielding of one set resulting in extra traversal of its block and consequent compensation of pressure.

It will thus be seen that whatever the differences of the internal diameter of the piston 6 about the several sets of pins, both sets are automatically forced outward with equal pressure, resulting in very rigid chucking of the piston.

We claim—

1. An internal chuck comprising a body providing an axial bore, two sets of pins mounted in the body, for radial movement, a wedge block for each set of pins, said blocks being slidable in said bore, a spindle rotatable and axially slidable in the body, said spindle being screw threaded and screwed through one wedge block and rotatably engaging the other block and imparting longitudinal movement thereto.

2. An internal chuck comprising a chuck stem, a hollow chuck head secured thereon, cylindrical wedge blocks slidable in the bore of the head and providing inclined wedge surfaces, pins mounted in the head for radial movement and said pins engaging the wedge blocks to prevent their rotation and bearing on the inclined wedge surfaces thereof, and a screw threaded rotatable spindle passing axially through the head, said spindle being screwed through one wedge block and rotatably engaging the other and imparting longitudinal movement thereto.

In testimony whereof, we affix our signatures.

ALFRED RAISON.
THOMAS ALFRED BURGESS.